United States Patent
Choe et al.

(10) Patent No.: US 7,418,371 B2
(45) Date of Patent: Aug. 26, 2008

(54) METHOD AND SYSTEM FOR GRAPHICAL HAIRSTYLE GENERATION USING STATISTICAL WISP MODEL AND PSEUDOPHYSICAL APPROACHES

(75) Inventors: Byoungwon Choe, Seoul (KR); Hyeong-Seok Ko, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 293 days.

(21) Appl. No.: 11/094,392

(22) Filed: Mar. 30, 2005

(65) Prior Publication Data

US 2006/0224366 A1 Oct. 5, 2006

(51) Int. Cl.
  *G06F 7/60* (2006.01)
  *G06G 7/48* (2006.01)
(52) U.S. Cl. .............................. 703/2; 703/6
(58) Field of Classification Search ............ 703/2, 703/6
See application file for complete search history.

(56) References Cited

OTHER PUBLICATIONS

Chen et al.; A system of 3D hair style synthesis based on the wisp model; The Visual Computer (1999) 15:159-170; Springer-Verlag 1999.*
Wang; Curly Hair Rendering; Ph D Thesis; pp. 1-103; 2001.*
Kim et al.; Interactive Multiresolution Hair Modeling and Editing; 2002 ACM 1-58113-521-1/02/0007; pp. 620-629.*
Zhu et al.; Exploring Texture Ensembles by Efficient Markov Chain Monte Carlo—Toward a Trichromacy Theory of Texture; IEEE Transactions on Pattern Analysis and Machine Intelligence, vol. 22, No. 6, Jun. 2000; pp. 554-569.*
Wang et al.; A sweeping algorithm for cluster hair rendering; The Visual Computer (2003) 19:187-204.*
S. Hadap and N. Magnenat-Thalmann. Modelling dynamic hair as a continuum. Computer Graphics Forum (Eurographics 2001), 20(3):329-338, 2001.
T. Kim and U. Neumann. A thin shell volume for modeling human hair. In Computer Animation 2000, pp. 104-111, May 2000.
T. Kim and U. Neumann. Interactive multiresolution hair modeling and editing. ACM Transactions on Graphics (Siggraph 2002), 21(3):620-629, Jul. 2002.
Y. Watanabe and Y. Suenaga. A trigonal prism-based method for hair image generation. IEEE Computer Graphics & Applications, 12(1):47-53, Jan. 1992.
Z. Xu and X. D. Yang. V-hairstudio: an interactive tool for hair design. IEEE Computer Graphics & Applications, 21(3):36-42, 2001.

(Continued)

*Primary Examiner*—Hugh Jones
(74) *Attorney, Agent, or Firm*—Park Law Firm; John K. Park

(57) ABSTRACT

A method for graphical hairstyle generation presents an interactive technique that produces static hairstyles by generating individual hair strands of the desired shape and color, subject to the presence of gravity and collisions. A variety of hairstyles can be generated by adjusting the wisp parameters while the deformation is solved efficiently accounting for the effects of gravity and collisions. Wisps are generated employing statistical approaches. As for hair deformation, a method is used based on physical simulation concepts but is simplified to efficiently solve the static shape of hair. On top of the statistical wisp model and the deformation solver, a constraint-based styler models artificial features that oppose the natural flow of hair under gravity and hair elasticity, such as a hairpin. Our technique spans a wider range of human hairstyles than previously proposed methods, and the styles generated by this technique are pretty realistic.

25 Claims, 10 Drawing Sheets

OTHER PUBLICATIONS

X. D. Yang, Z. Xu, J. Yang, and T. Wang. The cluster hair model. Graphical Models, 62(2):85-103, Mar. 2000.

Y. Yu. Modeling realistic virtual hairstyles. In 9th Pacific Conference on Computer Graphics and Applications, pp. 295-304, Oct. 2001.

S. Hadap and N. Magnenat-Thalmann. Interactive hair styler based on fluid flow. In Computer Animation and Simulation 2000, pp. 87-99, Aug. 2000.

J. T. Kajiya and T. L. Kay. Rendering fur with three dimensional textures. In Computer Graphics (Proceedings of Siggraph 89) vol. 23, pp. 271-280, Jul. 1989.

T. Kim and U. Neumann. Interactive multiresolution hair modeling and editing. ACM Transactions on Graphics (Siggraph 2002), 21(3):620-629, Jul. 2002.

A. LeBlanc, R. Turner, and D. Thalmann. Rendering hair using pixel blending and shadow buffer. Journal of Visualization and Computer Animation, 2:92-97, 1991.

D. Lee and H. Ko. Natural hairstyle modeling and animation. Graphical Models, 63(2):67-85, Mar. 2001.

T. Lokovic and E. Veach. Deep shadow maps. In Proceedings of ACM Siggraph 2000, Computer Graphics Proceedings, Annual Conference Series, pp. 385-392, Jul. 2000.

E..Plante, M. Cani, and P. Poulin. Capturing the complexity of hair motion. Graphical Models, 64(1):40-58, Jan. 2002.

K. Ward, M. C. Lin, J. Lee, S. Fisher, and D. Macri. Modeling hair using level-of-detail representations. In Proc. of Computer Animation and Social Agents, 2003, pp. 1-7.

K. Ward and M. C. Lin. Adaptive grouping and subdivision for simulating hair dynamics. In Pacific Conference on Computer Graphics and Applications, 2003, pp. 1-10.

L. Wei and M. Levoy. Fast texture synthesis using tree-structured vector quantization. In Proceedings of ACM Siggraph 2000, Annual Conference Series, pp. 479-488, Jul. 2000.

* cited by examiner

FIG. 1a
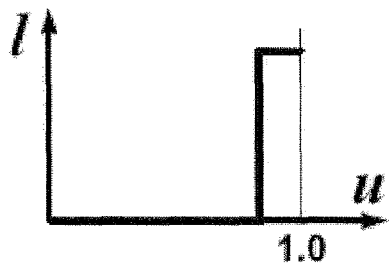
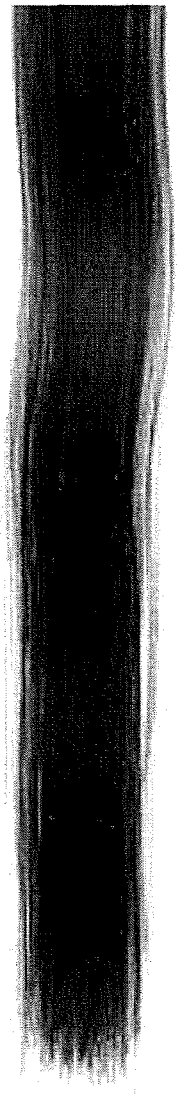
FIG. 1b
FIG. 2a
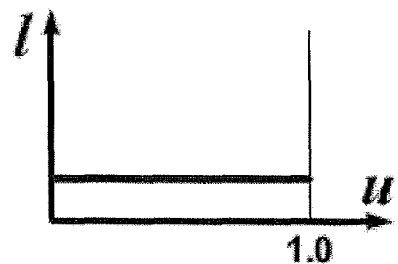
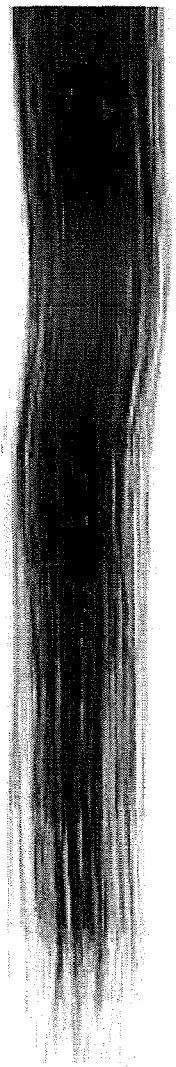
FIG. 2b

FIG. 3a
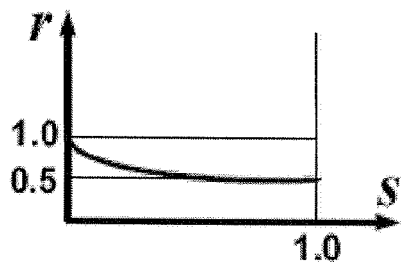
FIG. 4a
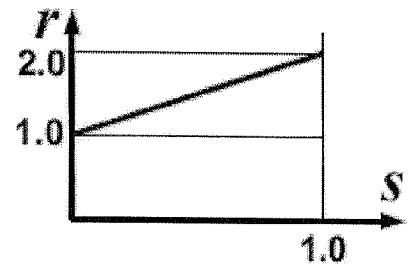
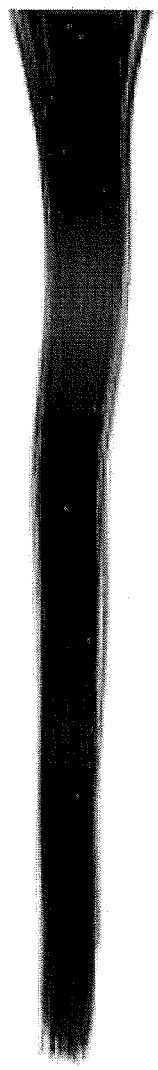
FIG. 3b
FIG. 4b $\sigma = 0.1$
$\sigma = 1$
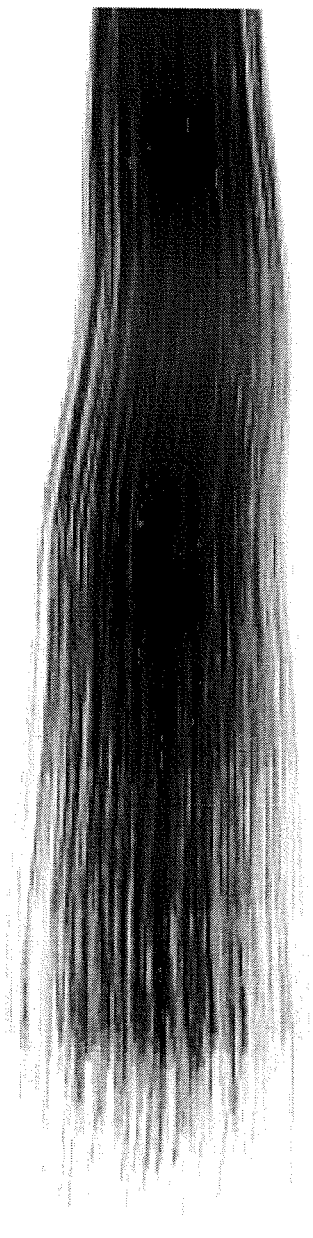
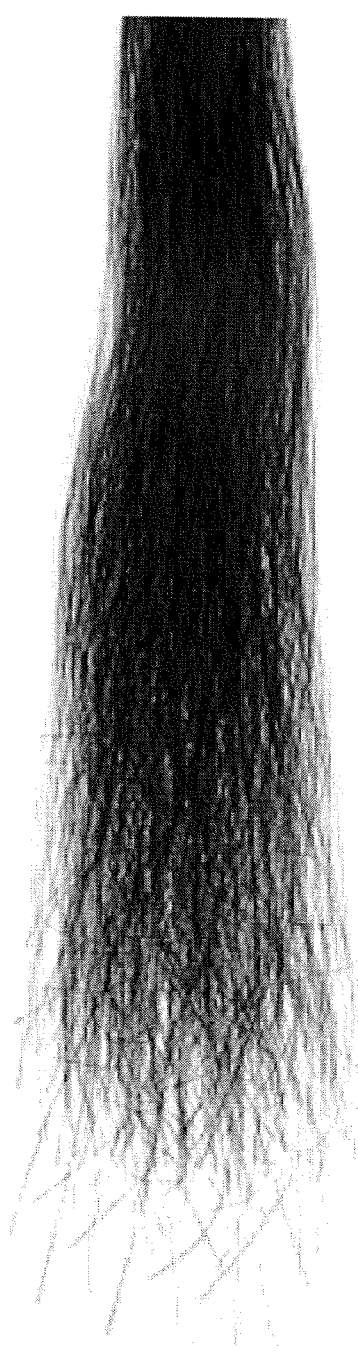
FIG. 5
FIG. 6

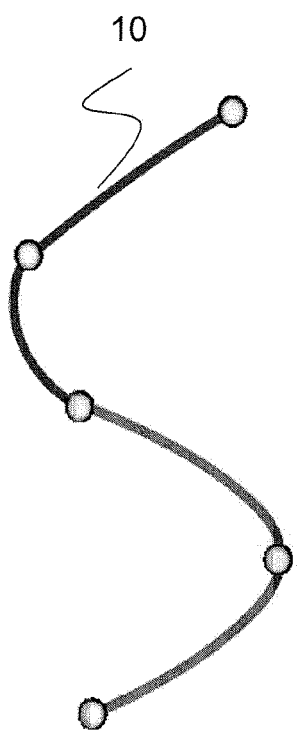
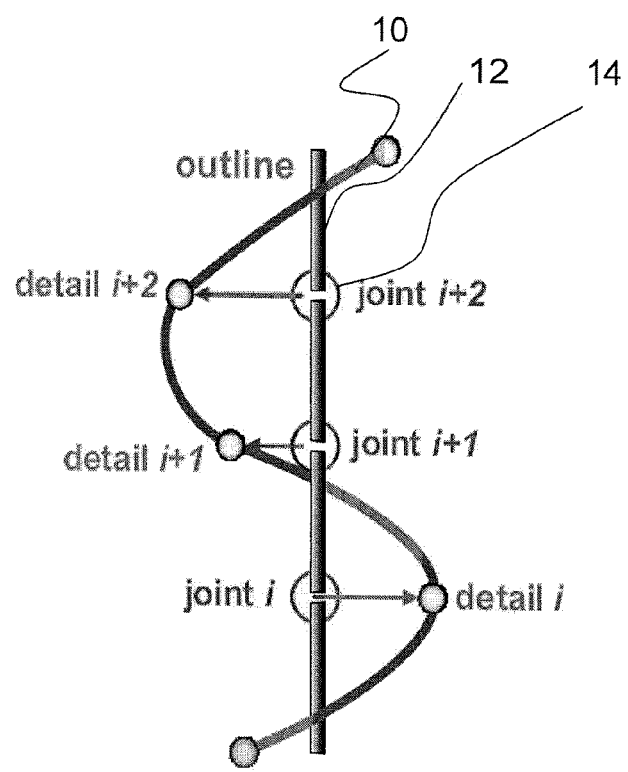
FIG. 8a
FIG. 8b 30    40    40    40    40

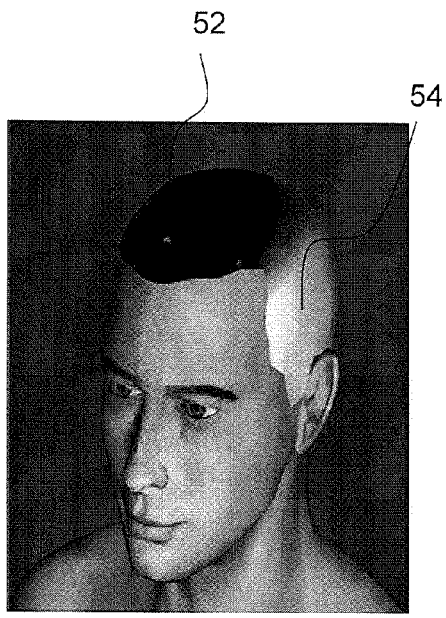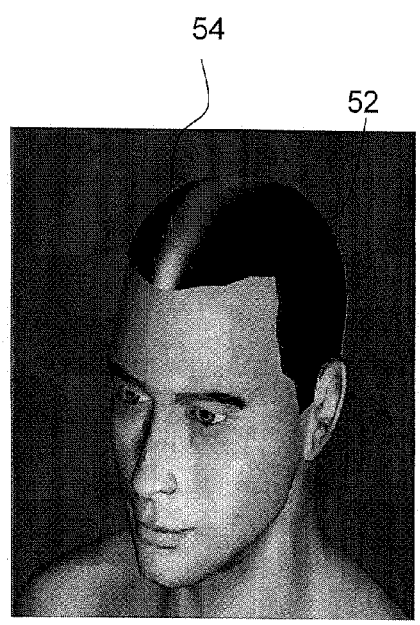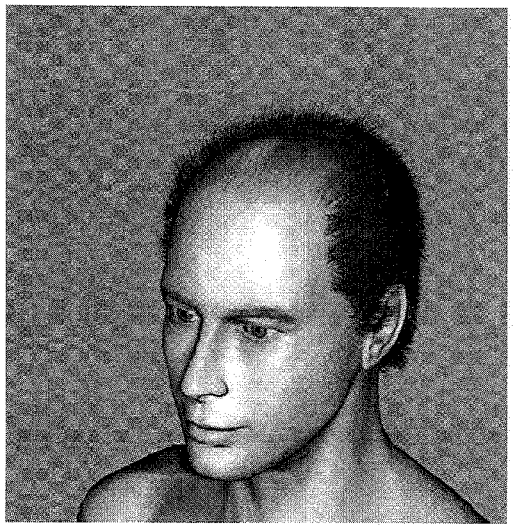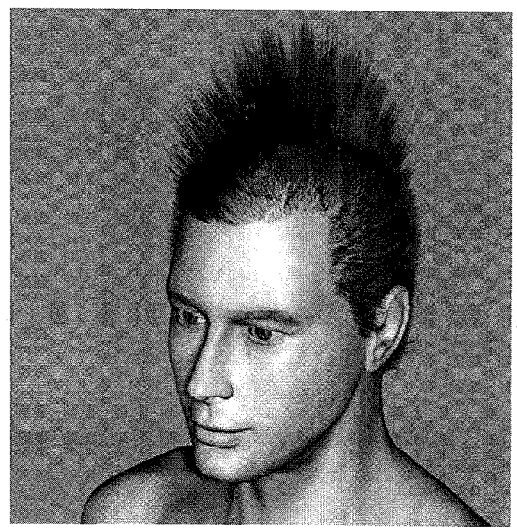
FIG. 11a          FIG. 11b

METHOD AND SYSTEM FOR GRAPHICAL HAIRSTYLE GENERATION USING STATISTICAL WISP MODEL AND PSEUDOPHYSICAL APPROACHES

BACKGROUND OF THE INVENTION

The present invention relates to a method and system for graphical hairstyle generation using statistical wisp model and pseudophysical approaches. More particularly, this invention relates to a method and system for graphical hairstyle generation, in which the hairstyles with realism and diversity is produced quite fast using the combination of the statistical wisp model, the hair deformation solver, the constraint-based styler and the stochastic hair color model.

1. Introduction

Hair constitutes an important part of a person's overall appearance. The same face can make quite different impressions as the person's hairstyle is varied. Therefore, to create visually convincing computer-generated humans, it is imperative to develop the techniques for synthesizing realistic hair.

Synthesizing hair requires the modeling, animation and rendering techniques. We aim to develop an interactive technique to generate static human hairstyles in the presence of gravity, with a proper treatment of collisions.

Hair strands are very thin (40 to 80 microns in shaft diameter for medium-sized strands [20]) and are subject to deformation. Therefore, physically-based methods such as finite element analysis or mass-spring simulation can be used to model the shape of a strand in a gravitational field. A simple collection of the strands generated by the above simulation methods, however, would appear different from hair we normally see because hair strands constantly touch or collide with each other; therefore the interactions among strands must be accounted for. Considering that there are normally about 100,000 strands of hair [23], the above task would require an enormous amount of computation if only physically-based methods were used.

The extreme opposite of the physically-based method would be to manually control every detail, including the effect of gravity and collisions, as well as the variations in hair strands. This would be labor-intensive, and more importantly, the result would appear unnatural unless the manual creation properly conveyed the complexity of real hair.

We propose a pseudophysical approach that produces realistic hairstyles from a few intuitive parameters and provides a means to edit the style in a straightforward way. Our method runs fast thus works interactively, but it does not require the users to engage in a cumbersome manual effort. For example, the effects of gravity and collisions are automatically generated by the hair deformation solver (Section 3). Variations among strands are generated using statistical methods (Section 2) that require only a few parameters to be input by the users. As a result, our method has a short turnaround time for modeling a hairstyle.

We note that the framework works in a fashion that is quite simple considering the complexity and variety of the hairstyles it generates. Rather than applying ad hoc methods to create different styles, the framework produces various hairstyles by modifying a small number of modeling parameters. Still, the synthesized hairstyles are realistic and demonstrate a wide range of hairdos in the real world.

1.1 Related Work

In this section, we review the previous work on modeling hair geometry, computing hair deformations due to gravity and collisions, and rendering techniques that can be applied to hair.

1.1.1 Modeling Hair Geometry

To model hair by populating a number of strands, the geometry of each individual strand must eventually be modeled. Noting that adjacent hair strands tend to be alike, Watanabe and Suenaga [27] introduced a wisp model to generate a group of similar neighboring strands by adding variations to one key strand. Since then, different methods such as the thin shell volume [12] and the generalized cylinder [29, 30] have been used to represent the wisps.

Recently, Kim and Neumann [14] proposed a multi-resolution wisp structure and user interfaces which could model a variety of hairstyles. Ward et al. [26] used level-of-detail representations which modeled individual strands and hair clusters with subdivision curves and surfaces respectively.

The concept of wisp is an important basis of this work. We also represent wisps using generalized cylinders. However, unlike the previous approaches which model strands and wisps manually or represent them by parametric functions, we introduce a statistical wisp model. Starting from a key strand, we construct a wisp by duplicating the key strand while constraining the wisp shape by some parameters with statistical meanings. Moreover, to generate the key strands, we introduce a Markov chain hair model by adopting the method proposed by Hertzmann et al. [10].

There have been other approaches that do not employ the wisp model. Hadap and Magnenat-Thalmann [8] and Yu [31] modeled hair as a flow of vector fields, and calculated the strand geometries according to these fields. In simulating dynamic movement of hair, interpolation-based approaches have generally been used [1, 5, 16, 24]: to reduce the computation required, only a relatively small number of key strands are simulated and the results are interpolated to generate the neighboring strands. The above approaches, however, are not suitable for modeling non-uniform behavior of human hair such as clustering, which is why we take a wisp-based hair model.

Apart from the above procedural or manual modeling of hair geometries, Paris et al. [21] proposed a technique to capture hair geometry from multiple images, which showed a new way to generate digital hair.

1.1.2 Modeling Hair Deformations

Deformations due to gravity and collisions can be dealt with by employing physically-based models such as a simplified cantilever beam model [1, 16], a mass-spring-hinge model [5, 24], or a combination of a multi-body serial chain and a continuum hair model [9]. Extensions to the above models to allow for the use of the wisp structure have also been proposed [3, 4, 22, 25]. However, those methods were targeted for animating hair of some limited styles, thus were not suitable for generating a variety of static hairstyles. Therefore, in the systems dedicated to modeling complicated hairstyles [14, 29, 30], the deformed hair shapes have been created.

In this work, we propose a new hair deformation solver which is different from the previous approaches: it is tailored to handle static hairstyles, and automatically generates the shape of hair that has been deformed due to the effects of gravity and collisions. The method is based on the physical principles involved in hair deformation, but is simplified to solve only static hair shapes.

1.1.3 Rendering Hair

To render a hair strand, Kajiya and Kay's reflectance model [7, 11] has been widely used; we also use this model in this work. Lately, Marschner et al. [19] measured the scattering from real individual hair fibers and proposed a shading model to render complicated scattering effects based on these observations. To account for self-shadowing among hair strands, LeBlanc et al. [15] proposed a method that uses pixel blending and shadow buffers. The deep shadow map proposed by Lokovic and Veach [18] extended the concept of a conventional shadow map to cover volumetric objects such as smoke and hair. Kim and Neumann [13] showed that the deep shadow map can be implemented efficiently on graphics hardware.

1.2 Algorithm Overview

Our algorithm for hair modeling consists of three Steps—generating wisps, solving hair deformation, and constraint-based styling.

1. Generating wisps: A whole hair is formed by generating a collection of wisps. We determine the geometrical shape of a wisp by manipulating a representative strand and controlling the statistical properties of the surrounding member strands.
2. Solving hair deformation: The hair deformation solver accounts for the effects of gravity, hair elasticity, and collisions to determine the deformed shape of the wisps. This procedure is essential for relieving the user of excessive manual effort, yet it is flexible enough to handle a wide range of hairstyles.
3. Constraint-based styling: To model hairstyles such as braided hair, we propose a constraint-based approach to make wisps pass through a certain point or follow a certain path. This approach is effective in modeling hairstyles that involve artificial styling pieces such as hairpins or ribbons.

This invention is directed to solve these problems and satisfy the long-felt need.

SUMMARY OF THE INVENTION

The present invention contrives to solve the disadvantages of the prior art.

An objective of the invention is to provide a method and system for graphical hairstyle generation using statistical wisp model and pseudophysical approaches.

Another objective of the invention is to provide a method and system for graphical hairstyle generation, in which in which the hairstyles with realism and diversity is produced quite fast using the combination of the statistical wisp model, the hair deformation solver, the constraint-based styler and the stochastic hair color model.

A method for graphical hairstyle generation includes steps of generating hair strands and wisps, solving the hair deformation, styling the hair, and rendering the hair strands.

The step of generating hair strands and wisps is done by controlling the statistical properties of hair using a statistical wisp model. The step of solving the hair deformation due to gravity and collisions between the hair by a pseudo-physical approaches is done by using a styling force field. The step of styling the hair is done by superimposing a constraint force field with the styling force field and solving the hair deformation. The step of rendering the hair strands is done by using probability density functions to represent the randomness of hair color.

The step of generating hair strands and wisps includes steps of modeling first hair strands and duplicating the first hair strands to the neighboring second hair strands. The step of modeling first hair strands is done by using an example-based Markov chain model from a given prototype strand, and the step of duplicating the first hair strands to the neighboring second hair strands is done by creating statistically-controlled variations. The hair strand is represented as a Catmull-Rom spline, and the Catmull-Rom spline is defined and passes through a sequence of control points $\{p_1, p_2, \ldots, p_n\}$, where the spline p(s) is parameterized within the range [0,1], and $p(0)=p_1$ and $p(1)=p_n$ correspond to the root and the tip of the strand respectively.

The overall shape of the wisp is a generalized cylinder and the hair strands within the wisp have a similarity. The degree of similarity of the strands within a wisp is controlled by a length distribution, a deviation radius function, and a strand-shape fuzziness value. The length distribution l(u) is probability density function that gives the probability that a member strand will have length u, relative to the length of the master strand, where the deviation radius function r(s) specifies an upper limit on the positional offset of the member strands from the master strand at the parameter value s and controls the shape of the generalized cylinder representing the wisp, and the strand-shape fuzziness value σ controls the variation of the strands within a wisp.

The second hair strands are formed from the first hair strands by applying l(u), r(s), and σ. The k-th control point $p_k$ of the second hair strand is computed by adding a displacement $d_k$ to the k-th control point of the first hair strand as $p_k = p_k^M + d_k$, where with a predetermined displacement at the root $d_1 = p_1 - p_1^M$, $d_k$ is computed iteratively using $$d_k = \frac{r_k}{r_{k-1}} d_{k-1} + e,$$

where $r_{k-1}$ and $r_k$ are the derivation radii at $p_{k-1}$ and $p_k$ respectively, and e is a three-dimensional noise vector. The noise vector $e = y\bar{x}$ lies within the sphere of radius $r_k$ according to the definition of the deviation radius function, and is determined by selecting the unit direction vector $\bar{x}$ randomly and choosing y randomly while $|d_k| < r_k$ is satisfied, where y is chosen by casting a ray originating from $$p_k^o = p_k^M + \frac{r_k}{r_{k-1}} d_{k-1}$$

in the direction of $\bar{x}$ until the ray intersects the sphere at a point $p_k^s$ and choosing a value from the uniform distribution of the range $[0, \min(L, \sigma \cdot r_k)]$ where L is the distance from $p_k^O$ to $p_k^S$.

The entire hair possesses a common pattern. The first hair strands are enforced to have the same pattern and then the same pattern is extended to the second hair strands, and a similar strand with a common pattern is synthesized from the prototype strand using the example-based Markov chain model with a Gibbs distribution to mathematically control the degree of similarity between the prototype and the synthesized strand.

The step of modeling the first hair strands includes steps of decomposing the control points and constructing the details component of a new strand.

The control points $\{p_1, p_2, \ldots p_n\}$ of the first hair strand is decomposed into an outline component $\{c_1, c_2, c_n\}$ and a details component $\{\delta_1, \delta_2, \ldots \delta_n\}$, $p_i = c_i + \delta_i$, where i=1, 2, ... n corresponding to the positions of the 3-DOF rotary joints, and the outline component corresponds to a straight line segment and the details component represents the position of the joint. The details component of a new strand is constructed by sequentially determining $\delta_i$ (i=1, 2, ..., n) until the strand reaches the desired length while observing only the neighborhood of $\delta_i$ where $\delta_i$ is determined by examining the prototype strand and finding the best match $\delta_k^*$ while restricting the comparison only to the neighborhood of $\delta_i$, where $\{\delta_1^*, \delta_2^*, \ldots \delta_n^*\}$ is the details component of the prototype strand.

The step of constructing the details component of the new strand includes a step of finding a portion $\omega(\delta_k^*)=\{\delta_{k-h}^*, \delta_{k-h+1}^*, \ldots, \delta_{k-1}^*\}$ of the prototype strand to determine $\delta_i$, and $\omega_k^*$ minimizes $\epsilon(\omega_i,\omega_k^*)$, where $$\varepsilon(\omega_i, \omega_j) = \sqrt{\sum_{t=1}^{h} |\delta_{i-t} - \delta_{j-t}|^2}$$

is an Euclidean distance between the two h-sized portion $\omega(\delta_i)$ and $\omega(\delta_j)$.

The step of constructing the details component of the new strand includes a step of selecting the details component stochastically using the Gibbs distribution as a selection probability $P_k$ for each possible portion of the prototype strand $$P_k = \frac{1}{Z}\exp\left(-\frac{\varepsilon(\omega_i, \omega_k^*)}{T}\right),$$

where T is the temperature of the system, which can be controlled by the user, and Z is the partition function defined by $$Z = \sum_k \exp(-\varepsilon(\omega_i, \omega_k^*)/T).$$

The root positions of the first hair strands are determined by distributing the number of points over the scalp region and the roots of the second hair strands are randomly located within each Voronoi region, where Voronoi diagrams are generated to set the boundary of each wisp.

The step of generating hair comprises a step of constructing a density, length and protrusion maps defining the corresponding hair properties for every point in the scalp region, and the length and protrusion direction of the first hair strands is determined by the length and protrusion maps.

The step of solving the hair deformation repeats steps of deforming the strands based on the styling force field and updating the density field based on the deformation, and the steps run preferably in breadth-first order.

The step of deforming the strands includes steps of dealing with gravity and the current styling operation as a unified force field $\Phi(x)$, modeling hair as a continuum and forcing the collided hairs to occupy a larger volume, rotating each of the joints along an entire first hair strand by the styling force field $\Phi(x)$, and detecting hair collisions at the wisp level and reorienting the collided wisp segment.

The gravity and the current styling operation is dealt with as a unified force field $\Phi(x)$ using pseudo-physical approaches. In modeling hair as a continuum, interpreting density as a measure of collision, and forcing the collided hairs to occupy a larger volume, it is regarded that a collision occurs when the density of a certain region is above a given threshold. The joints along an entire first hair strand is rotated by the styling force field $\Phi(x)$ so that the outline segment attached to the joint is oriented along $\Phi(x)$, where x is a point in 3D space hair collisions is detected at the wisp level and reorienting the collided wisp segment based on the gradient of the density field.

The step of rotating the joint by the styling force field includes a step of determining the orientation of a segment by finding the joint angle that maximizes the equation, $E=E_\Phi + \kappa E_B$, where $E_\Phi$, the degree to which the strand is aligned with the force field, and $E_B$, the degree to which the strand is aligned with its rest position, are calculated as $E_\Phi=\Phi(x)\cdot q$ and $E_B=q_0\cdot q$, where q is the unit direction vector of the segment and $q_0$ is the direction of the segment when the joint angle is zero.

The step of detecting hair collisions and reorienting the collided wisp segment includes steps of creating a density field for each wisp segment and determining a collision. The density field for each wisp segment is created by computing density value $$\rho = N\frac{r_s^2}{r_w^2},$$

where N is the number of strands in the wisp, $r_s$ is the average radius of the strands in the wisp, $r_w$ is the radius of the wisp. The collision is determined by checking the condition $\rho(x)+\rho_A(x)>\tau$, where $\rho(x)$ is an existing density value at x, $\rho_A(x)$ is an increased density due to the positioning of the wisp segment, and $\tau$ is a density threshold.

The step of styling the hair includes steps of selecting the portion of hair, building a constraint queue, superimposing the constraint force field with the styling force field for the selected portion, and solving the deformation with the modified styling force field. The portion of hair consisting of a set of wisps is selected to apply the constraints. The constraint queue, a sequence of constraints, is built to apply to the selected portion;

The constraint force field $\Psi(x)$ is superimposed with the styling force field $\Phi(x)$ to give a modified styling force field, $\Phi'(x)=(1-w)\Phi(x)+w\Psi(x)$, where w is a weight of the constraint force field.

The constraint force field includes point constraint, trajectory constraints, and direction constraint. The point constraint is specified by an attraction point and a tolerance radius, producing vector fields toward the attraction point. The trajectory constraints are specified by a trajectory and a tolerance radius, generating unit vectors toward the nearest point of the trajectory for grid points lying outside the tolerance radius, or in the tangential direction of the trajectory for grid points lying inside the tolerance radius. The direction constraint is specified by a trajectory and an influence radius, generating unit vectors in the tangential direction of the trajectory for grid points lying within the influence radius.

The step of rendering the hair strands includes a step of modulating the change of hair colors stochastically using independent probability density functions for a plurality of coloring properties with either uniform or Gaussian distribution. The coloring properties are represented by a HSV color space, model hue, and saturation and value channels.

The step of rendering the hair further includes steps of converting the Catmull-Rom splines to thin ribbons to render individual hair strands, shading each strand using hair shading model, and representing the self-shadowing among hair strands using deep shadow map.

The method further includes steps of constructing the styling force field and simulating basic hairdressing operations. The styling force field is constructed by controlling the force field for the rough-level control of a hairstyle and generating the geometric details inside the wisp model. The basic hairdressing operations comprise cutting, permanent waving, combing, tying, and braiding.

The cutting is implemented by directly editing the length map. The permanent waving is implemented by giving a prototype strand of the desired shape to the statistical wisp model. The combing is implemented using a direction constraint by selecting a portion of hair for combing and indicating the desired trajectory, and specifying the weight that controls the influence of the constraint force field relative to the styling force field. The tying is implemented by selecting the portion to tie, imposing a point constraint so that the selected portion is attracted to the point, setting the weight value to a maximum so that the portion is entirely affected by the constraint force field. The braiding is implemented by applying a point constraint followed by a trajectory constraint to three or more groups of hair, where each group of strands is first gathered at the point specified by the point constraint, and then the trajectory constraint is applied so that the strands form braids.

In another embodiment, a method for graphical hairstyle generation includes steps of constructing a density map, a length map, and a protrusion map for hairs, tuning the global parameters including the number of wisps and the number of strands, editing the geometry of the prototype strand by modeling the prototype strand with a 3D spline curve, tuning the wisp parameters including the length distribution, deviation radius function, and fuzziness value, setting up the styling force field, and tuning the deformation parameters including the bending stiffness and the density threshold.

A system for interactive hairstyle generation using statistical wisp model and pseudo-physical approaches includes a hair strand generating module, a hair deformation solving module, a hair styling module, a hair rendering module, and a styling force field constructing module.

The hair strand generating module is for generating hair strands and wisps by controlling the statistical properties of hair using a statistical wisp model. The hair deformation solving module is for solving the hair deformation due to gravity and collisions between the hair by a pseudo-physical approaches using a styling force field. The hair styling module is for styling the hair by superimposing a constraint force field with the styling force field and solving the hair deformation. The a hair rendering module is for rendering the hair strands using probability density functions to represent the randomness of hair color. The styling force field constructing module is for constructing a styling force field using procedural approach with a means for editing a vector field.

The styling force field constructing module includes a vector field editor.

The system may further includes a parameter controller for controlling the behavior of the modules by providing predetermined set of control parameters.

The advantages of the present invention are: (1) the method is fast to produce realistic hairstyles and (2) the method generates a diversity of hairstyles by modifying a small number of wisp parameters.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 1a is a graph of a first length distribution;

FIG. 1b is a perspective view of wisps generated by the length distribution of FIG. 1a;

FIG. 2a is a graph of a second length distribution;

FIG. 2b is a perspective view of wisps generated by the length distribution of FIG. 2a;

FIG. 3a is a graph of a first deviation radius distribution;

FIG. 3b is a perspective view of wisps generated by the length distribution of FIG. 3a;

FIG. 4a is a graph of a second deviation radius distribution;

FIG. 4b is a perspective view of wisps generated by the length distribution of FIG. 4a;

FIG. 5 is a perspective view of wisps generated by a first fuzziness value;

FIG. 6 is a perspective view of wisps generated by a second fuzziness value;

FIG. 8a is a perspective view of a master strand;

FIG. 8b is a perspective view of the master strand showing the outline and details components;

FIGS. 11a and 11b are diagrams showing density and length maps and their effects;

DETAILED DESCRIPTION OF THE INVENTION

2. Statistical Wisp Model

It is readily observable that hair exhibits clustering behavior; a group of hair strands that are spatially close and geometrically similar is called a wisp. We view the task of synthesizing a hairstyle as generating a collection of wisps. This section describes how we generate the hair strands and wisps by controlling the statistical properties of hair.

2.1 Wisp Modeling

Our wisp model consists of a master strand 10 and numerous member strands 20, and the overall shape of the wisp is a generalized cylinder. This section describes the wisp generation algorithm under the assumption that the geometry of the master strand 10 is given; the method for generating the master strand 10 is presented in Section 2.2.

We represent a strand as a Catmull-Rom spline, which is defined by and passes through a sequence of control points $\{p_1, p_2, \ldots p_n\}$ The spline $p(s)$ is parameterized within the range $[0,1]$, so that $p(0)=p_1$ and $p(1)=p_n$ correspond to the root and tip of the strand respectively.

Within a wisp, the degree of similarity among the strands is controlled by the length distribution, the deviation radius function, and the strand-shape fuzziness value.

Length distribution $l(u)$ is a probability density function that gives the probability that a member strand 20 will have length u, relative to the length of the master strand 10 as shown in FIGS. 1 and 2.

Deviation radius function r(s) specifies an upper limit on the positional offset of the member strands 20 from the master strand 10 at the parameter value s; it controls the shape of the generalized cylinder representing the wisp as shown in FIGS. 3 and 4.

Strand-shape fuzziness value ρ controls the variation of the strands within a wisp. FIGS. 5 and 6 show the appearance of wisps at ρ=0.1 (low variance) and ρ=1 (high variance).

Now, the member strands 20 are formed from the master strand 10 by applying l(u), r(s) and ρ. The k-th control point $p_k$ of a member strand 20 is computed by adding a displacement $d_k$ to the k-th control point $p_k^M$ of the master strand 10: $p_k = p_k^M + d_k$. Assuming that the displacement at the root $d^1 = p_1 - p_1^M$ is known, $d_k$ is computed iteratively using the equation:

$$d_k = \frac{r_k}{r_{k-1}} d_{k-1} + e, \quad (1)$$

where $r_{k-1}$ and $r_k$ are the deviation radii at $p_{k-1}$ and $p_k$ respectively, e is a three-dimensional noise vector.

The vector e cannot have an arbitrary value because $d_k$ must lie within the sphere of radius $r_k$ according to the definition of the deviation radius function. Let the noise vector be expressed as $e = y\bar{x}$, where $\bar{x}$ is a unit direction vector and y is a scalar value. To determine the noise vector e:

1. $\bar{x}$ is randomly selected;
2. y is randomly chosen while $|d_k| < r_k$ is satisfied.

Figure 7:
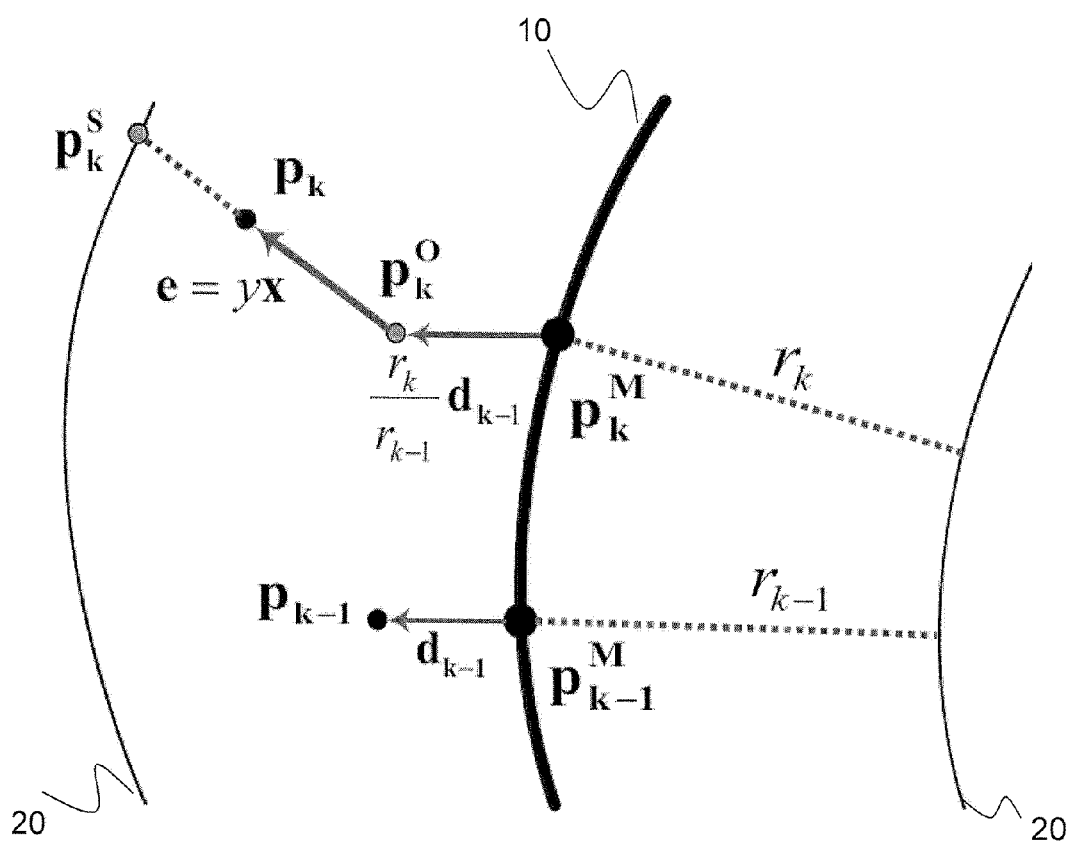
FIG. 7 is a diagram showing a concept of computing a point of a member strand from the points of the master strand.

To find y, a ray is cast originating from $$p_k^O = p_k^M + \frac{r_k}{r_{k-1}} d_{k-1}$$

in the direction of $\bar{x}$ until the ray intersects the sphere at a point $p_k^S$. Let L be the distance from $p_k^O$ to $p_k^S$. A value for y is then chosen from the uniform distribution of the range [0,min(L, σ·$r_k$)] as illustrated in FIG. 7. Therefore, $d_k$ remains within the sphere, and the control points of the member strands 20 are not concentrated at the boundary of the sphere.

The above procedure is repeated until the member strand 20 attains the desired length $u$ relative to the master strand 10.

2.2 Master Strand Modeling

The wisp modeling algorithm assumes that the master strands 10 have been already given. This section presents how we actually model the geometry of a master strand 10.

It is generally accepted that hair strands from a single person resemble each other, which forms a unique characteristic of the person's hairstyle. In our wisp model, an effective way of ensuring that the entire hair possesses a common pattern is to enforce that all the master strands 10 have the same pattern. Then the member strand 20 generation algorithm (Section 2.1) extends this pattern to the entire hair.

We obtain the master strands 10 of a common pattern by synthesizing new strands that resemble a given prototype strand 30. To synthesize a new similar strand from the prototype 30, we adopt the example-based Markov chain models [6, 10, 28], but formulate it as a Gibbs distribution to mathematically control the degree of similarity between the prototype 30 and the synthesized strand 40.

2.2.1 Strand Representation

Instead of directly manipulating the control points $\{p_1, p_2, \ldots, p_n\}$ of a master strand 10, we decompose them into an outline component $\{c_1, c_2, \ldots c_n\}$ 12 and a details component $\{\delta_1, \delta_2, \ldots, \delta_n\}$, such that $p_i = c_i + \delta_i$ (i=1, 2, ..., n). In FIG. 8b, the straight line segments at the center correspond to the outline component 12 of the strand; they are connected with 3-DOF rotary joints 14, and $c_i$ represents the position of the joint center 14. We use the segments of the equal length between the joints 14 to simplify the calculation of deformations in Section 3. The displacements from the joint centers 14 to the control points correspond to the details component.

The purpose of the decomposition is to separate the intrinsic geometry of the strand from the deformations applied to it by styling procedures. The subsequent deformations of the strand modify only the joint angles of the outline component 12, but do not modify the details component. As a consequence, the geometrical characteristics—which are encoded by the details component—can be preserved.

2.2.2 Strand Synthesis

The outline component 12 of the strand consists of straight line segments, thus is determined straightforwardly once the segment length $L_s$ is given. This section describes how the details component is generated from a prototype strand 30.

Figure 9:
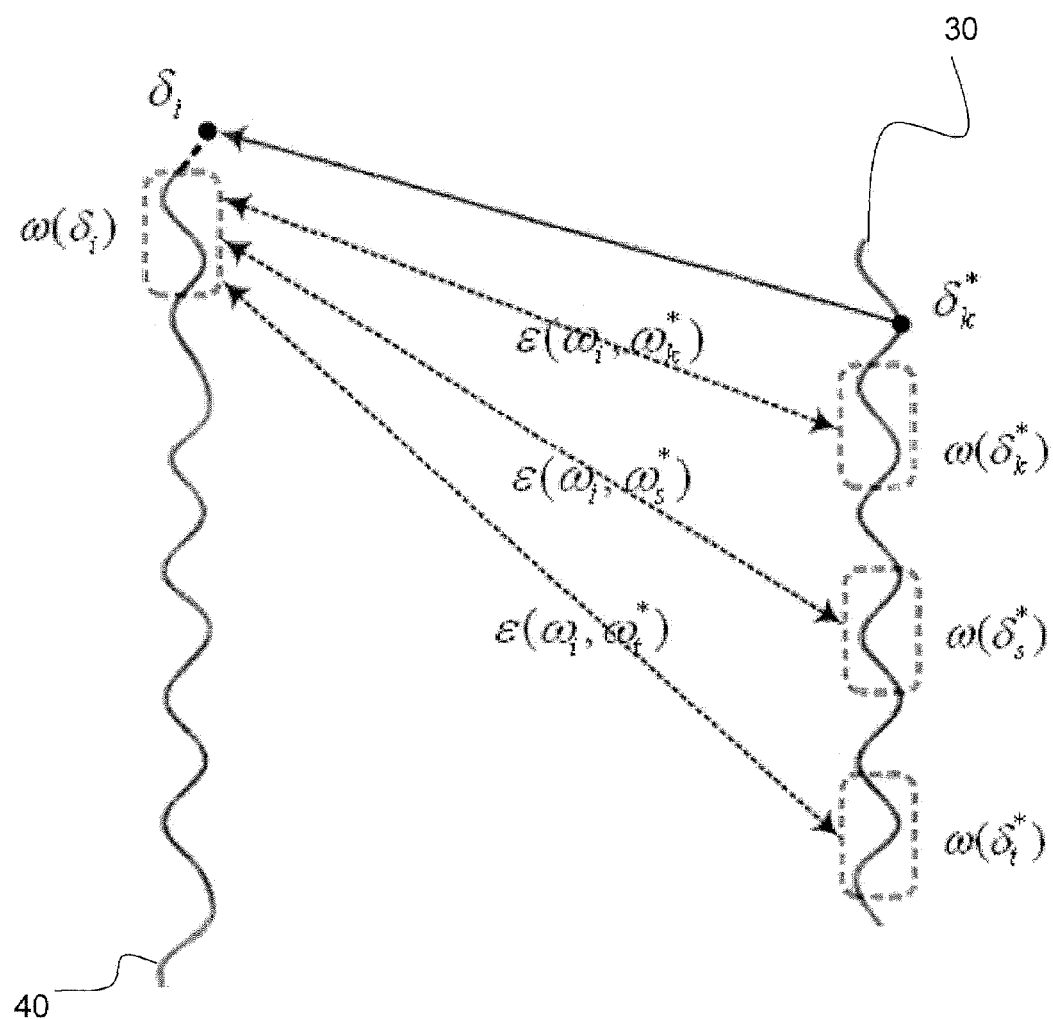
FIG. 9 is a diagram showing a concept of synthesizing a new strand from a prototype.
Figure 10A:
FIGS. 10a to 10e are perspective views of master strands for different temperatures.
Figure 10B:
Figure 10C:
Figure 10D:
Figure 10E:

The control points of a new strand must be established so that the strand resembles the given prototype 30. Assuming that a hair strand can be modeled as a Markov chain, we can construct the details component by sequentially determining $\delta_i$(i=1, 2, ..., n) until the curve has reached the desired length while observing only the neighborhood of $\delta_i$. Let $\{\delta_1^*, \delta_1^*, \ldots, \delta_n^*\}$ be the details component of the prototype strand 30. To determine $\delta_i$, we examine the prototype strand 30 and find the best match $\delta_k^*$ while restricting the comparison only to the neighborhood of $\delta_i$ as illustrated in FIG. 9. We adopt a similar approach used in "curve analogy" [10], which can be referenced for the detailed description of the curve synthesis algorithms using Markov chains.

In FIG. 9, it is shown synthesizing a new strand from a prototype 30. To find $\delta_i$, the window $\omega(\delta_i)$ is compared with every possible window in the prototype 30, then $\delta_k^*$ is selected from the prototype 30 based on Eq. (4).

The neighborhood is modeled as a window—a set of control points—around the current control point. Intuitively, the size of the window should be on the scale of the largest regular structure of the curve; otherwise, the structure may be lost. We also let the neighborhood be causal: we construct the neighborhood containing only the points preceding the current point. Therefore, in the sequence of the details component $\{\delta_1, \delta_2, \ldots, \delta_n\}$, the neighborhood of $\delta_i$ is defined by $\omega(\delta_i) = \{\delta_{i-h}, \delta_{i-h+1}, \ldots, \delta_{i-1}\}$, where h is the window size.

Let $\epsilon(\omega_i, \omega_j)$ be the Euclidean distance between the two h-sized windows $\omega(\delta_i)$ and $\omega(\delta_j)$:

$$\varepsilon(\omega_i, \omega_j) = \sqrt{\sum_{t=1}^{h} |\delta_{i-t} - \delta_{j-t}|^2}. \quad (2)$$

Now, the problem of determining $\delta_i$ so that $\omega(\delta_i)$ resembles the prototype pattern can be reduced to finding a portion $\omega(\delta_k^*) = \{\delta_{k-h}^*, \delta_{k-h+1}^*, \ldots, \delta_{k-1}^*\}$ of the prototype strand 30 such that $$\min_k \{\varepsilon(\omega_i, \omega_k^*)\}. \tag{3}$$

Then we can deterministically specify $\delta_i$ to be $\delta_i = \delta_k^*$.

However, the diversity of synthesized strands 40 can be increased by stochastically selecting the details component instead of the optimal choice given by Eq. (3). We introduce the Gibbs distribution as a selection probability $P_k$ for each possible window of the prototype strand 30:

$$P_k = \frac{1}{Z} \exp\left(-\frac{\varepsilon(\omega_i, \omega_k^*)}{T}\right), \tag{4}$$

where T is the temperature of the system, which can be controlled by the user, and Z is the partition function defined by $$Z = \sum_k \exp(-\varepsilon(\omega_i, \omega_k^*)/T).$$

The strand diversity increases as T increases, which is demonstrated in FIG. 10.

2.3 Global Hair Parameters

At the topmost level, the user sets the number of wisps $N_w$ and the total number of hair strands $N_s$. The user then interactively constructs the density, length and protrusion maps which define the corresponding hair properties for every point in the scalp region. The effects of the density and length maps are illustrated in FIG. 11. Density and length maps and their effects: (a) a density map (top)—with bright area 54 representing high density and dark area 52 representing low density—and its effect on hair (bottom), (b) a length map (top)—with bright area representing long hair and dark area 52 representing short hair—and its effect on hair.

Once $N_w$ is given, the root positions of the master strands 10 are determined by evenly distributing the number of points over the scalp region. Voronoi diagrams can then be generated to set the boundary of each wisp. Finally, using the density map and $N_s$, the roots of the member strands 20 are randomly located within each Voronoi region.

Note that the length and protrusion maps are used to determine the length and protrusion direction of the master strands 10. For the member strands 20, these properties are determined by the algorithm presented in Section 2.1.

3. Hair Deformation Solver

In this section, we address the problem of determining the shape of wisps under the influence of gravity and collisions. The purpose of the hair deformation solver is to find the joint angles of the master strands 10 after these factors are taken into account. Then the shape of the member strands 20 are routinely determined from the shape of the master strand 10 (Section 2.1).

Our hair deformation solver is based on two ideas. Firstly, it incorporates the physical properties of hair, but avoids dynamics simulation. Styling operations such as braiding assemble hair into a complex structure that is beyond the realm of the simple Newtonian mechanics. Instead of simulating those situations in a pure physically-based way, we deal with gravity and the current styling operation as a unified force field, and solve the deformation employing pseudo-physical approaches. Secondly, the deformation solver models hair as a continuum, as proposed by Hadap and Magnenat-Thalmann [9], and interprets density as a measure of collision. When the density of a certain region is above a threshold, it is regarded as a collision and the hair is forced to occupy a larger volume.

We implement the two ideas within a single framework. The deformation solver works quickly, and can be applied to a wide range of hairstyles.

3.1 Deformation Due to Styling Force Field

The styling force field $\Phi(x)$, defined in 3D space, quantitatively combines the effects of gravity and styling operations to represent the desired flow direction and intensity at each 3D point x. The force fields rotate the joint 14 so that the outline segment 12 (FIG. 8) attached to the joint 14 is oriented along $\Phi(x)$. However, hair has an elastic property that resists such deformation in proportion to the bending amount and stiffness. Therefore, we determine the orientation of a segment by finding the joint angle that maximizes the equation $$E = E_\Phi + \kappa E_B, \tag{5}$$

where $E_\Phi$ represents the degree to which the strand is aligned with the force field, and $E_B$ represents the degree to which the strand is aligned with its rest position. Let q be the unit direction vector of the segment. $E_\Phi$ is calculated by the function $E_\Phi = \Phi(x) \cdot q$ and its value is greatest when q is aligned with $\Phi(x)$. $E_B$ represents the (inversely proportional) amount of bending by $E_B = q_0 \cdot q$, where $q_0$ is the direction of the segment when the joint angle is zero. Finally, $\kappa$ is the scalar value that models the bending stiffness of hair. FIGS. 11a and 11b show the resulting deformation for two different values of $\kappa$.

Since the optimization function in Eq. (5) is linear, it can be easily solved to find the unit vector $q^*$ that maximizes it. The joint angle corresponding to $q^*$ can then be calculated straightforwardly.

The above procedure determines the angle for a single joint 14. To determine the shape of an entire master strand 10, the procedure is repeated along the strand, from the root to the tip.

3.2 Deformation Due to Density Field

We now account for the hair-to-head and hair-to-hair collisions. Detecting collisions between every pair of strands would be computationally intractable. Fortunately, when we observe a hairstyle, collisions between individual strands are not noticeable. When wisps cross each other, however, it produces unmistakable artifacts. Therefore, our collision resolution method is developed to handle collisions at the wisp level.

We interpret that hair produces a density field. Even though the geometries of the strands are defined after the wisps are generated (Section 2), the strands are regarded not existing yet. When the hair deformation solver starts processing strands, the density over the entire space is zero. Once the solver calculates a segment, the density corresponding to the segment is created. When the procedure in Section 3.1 would locate a wisp segment in a position x, it is first checked whether the following condition can be met:

$$\rho(x) + \rho_A(x) > \tau \tag{6}$$

where $\rho(x)$ is the existing density value at x, $\rho_A(x)$ is the increased density that would be added due to the positioning of the wisp segment, and $\tau$ is the density threshold. When the sum on the left hand side of the equation $\rho(x) + \rho_A(x) > \tau$ is greater than $\tau$, this is treated as a collision and the segment is reoriented based on the gradient of the density field. When a small value is used for τ, the overall hair volume becomes larger.

Implementation Using a 3D Grid Structure

The description of the previous two sections was based on continuous fields. To implement the algorithms in a discretized space, a three-dimensional grid is constructed around the head and shoulder that includes all regions where hair may potentially be placed during the styling process. The values of the styling force and density are then stored only for points on the grid. The styling force and density at an arbitrary point in the 3D space is obtained by performing a tri-linear interpolation of the values at the eight nearest grid points.

The hair deformation solver works by repeating the following two steps: (1) deform the strands based on the fields, and (2) update the density field based on the deformation. One question remains: whether the steps should run in the breadth-first order or depth-first order. We choose the breadth-first order with the rationale that this handles hair-to-hair collisions better than the depth-first order does, especially because the master strands 10 have the segments of the equal length (Section 2). We summarize the procedure for the hair deformation solver in Algorithm 1.

```
Algorithm 1 Hair deformation solver
initializeDensityField( ); // 1 inside and 0 outside the head
for joint = 1 to J /* root-to-tip order */ do
    for wisp = 1 to W do
        deformByStylingForceField( ); /* Eq. (5) */
        for grid points occupied by the wisp segment do
            while checkCollision( ) /* Eq. (6) */ do
                bend the joint by Δθ along the density gradient;
            end while
        end for
        updateDensityField( ); // add the density of this segment
    end for
end for
```

4. Constraint-Based Styler

The hair deformation solver is quite powerful in producing the styles that are based on the natural flow of hair under the gravity field. However, the method is not easily applicable to producing artificial hairstyles such as braids. To produce such types of hairstyles, we take a new approach—styling constraints.

A constraint causes a constraint force field $\Psi(x)$ to be generated over a portion of the 3D space, as shown in FIG. 12. When and only when the hair deformation solver processes the portion being constrained, instead of the original styling force field $\Phi(x)$, it uses a modified styling force field $\Phi'(x)$ given by $$\Phi'(x)=(1-w)\Phi(x)+w\Psi(x), \quad (7)$$

where the control parameter w is the weight of the constraint force field $\Psi(x)$ relative to the original styling force field $\Phi(x)$. Other than the selective superimposition of the constraint force field over the original styling force field, the hair deformation solver works in the same way.

Based on the results of our experiments, we have concluded that three types of styling constraints illustrated in FIG. 12 can be used to create the most of artificial hairstyles.

Figure 12A:
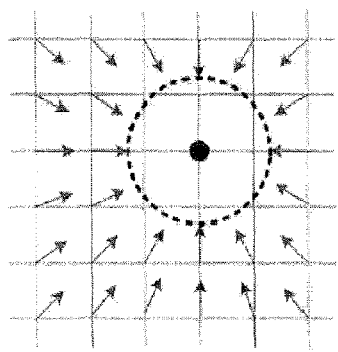
FIG. 12a is a vector diagram for a point constraint.

Point Constraint: A point constraint is specified by an attraction point and a tolerance radius. This constraint produces vector fields toward the attraction point, as shown in FIG. 12a. The constraint force vector is activated only until the wisp comes within the sphere.

Figure 12B:
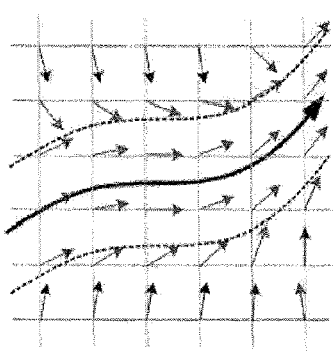
FIG. 12b is a vector diagram for a trajectory constraint.

Trajectory Constraint: A trajectory constraint is specified by a trajectory and a tolerance radius. The constraint generates unit vectors (1) toward the nearest point of the trajectory for grid points lying outside the tolerance radius, or (2) in the tangential direction of the trajectory for grid points lying inside the tolerance radius, as shown in FIG. 12b.

Figure 12C:
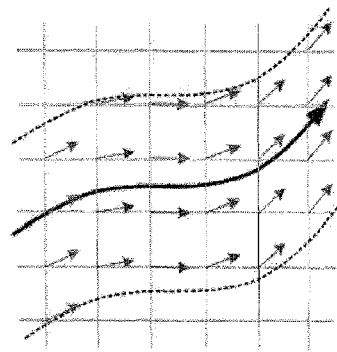
FIG. 12c is a vector diagram for a direction constraint.

Direction Constraint: A direction constraint is specified by a trajectory and an influence radius. For grid points lying within the influence radius, the constraint generates unit vectors in the tangential direction of the trajectory, as shown in FIG. 12c.

The functioning of the constraint-based styler can be summarized as follows:

1. Select the portion of hair, consisting of a set of wisps, to apply the constraints;
2. Build a constraint queue, a sequence of constraints, to apply to the selected portion.

When the hair deformation solver processes those selected wisps, the constraint force field $\Psi(x)$ is superimposed with the styling force field $\Psi(x)$ produced by the constraints. The constraint-based styler activates the first constraint in the queue and processes the selected wisps until they all meet the constraint. It then processes each subsequent constraint, one at a time, in the queue. When all of the constraints have been processed, the hair deformation solver resumes processing the wisps in the usual way.

5. Rendering

The geometric models of hair would not look natural unless they are rendered properly. Rendering quality is more important for hair than other parts of the body. This section addresses two problems: how to determine the colors of individual strands, and how to render the hair geometries.

The colors of strands taken from the same person might appear to be similar. However, closer examination reveals that no two hair strands have exactly the same color. To modulate the change of hair colors, a stochastic approach is employed. We adopt HSV color space, and model hue, saturation and value (brightness) channels as three independent probability density functions, using either uniform or Gaussian distributions. We can also control the color variations at the wisp level.

In order to explicitly render individual hair strands, the Catmull-Rom splines, representing the strands (Section 2), are converted to thin ribbons using the "RiCurves" primitive in RenderMan™ [2]. Then the hair shading model proposed by Kajiya and Kay [11] is used for shading each strand. Finally, the deep shadow map [18] is used to represent the self-shadowing among hair strands, which is essential for creating the volumetric appearance of hair.

6. Results

We implemented the presented techniques on a PC with an Intel Pentium (4) 2.54 GHz CPU and an NVIDIA GeForce FX 5600 GPU. To check the intermediate results during styling processes, we also implemented a renderer on a programmable graphics hardware [17].

Using our hair modeling system, both ordinary users and professional hairstylists were asked to either reproduce hairstyles from beauty magazines or to create novel hairstyles.

To help the readers understand how the whole system works, we summarize the steps taken for the hairstyling. The user starts the styling work on a given 3D polygon model of head and shoulder. In a preprocessing step, the scalp surface is specified as a polygonal surface, which defines the region where hair follicles exist. Then, the following steps are taken:

1. Construct the density, length, and protrusion maps.
2. Tune the global parameters—the number of wisps $N_w$ and the number of strands $N_s$.
3. Edit the geometry of the prototype strand 30: The user models the prototype strand 30 with a 3D spline curve. We also provided pre-modeled samples representing the various types of curly and wavy hair so that he/she could simply select one from the samples.
4. Tune the wisp parameters—the length distribution $l(u)$, deviation radius function $r(s)$, and fuzziness value and $\sigma$.
5. Setup the styling force field (see Section 6.1 for the details).
6. Tune the deformation parameters—the bending stiffness $\kappa$ and the density threshold $\tau$.
7. Specify the hair color: When the user uses the Gaussian color model, he or she inputs the mean and variance of three HSV channels.

Some hairstyles have been created by taking the above modeling steps. Approximately 80,000 to 100,000 hair strands were used for generating each hairstyle. The computation time greatly depended on the number of control points in a strand as well as $N_w$ and $N_s$. In the initial setup, most time is spent on user interactions for preparing input to the system. However, once the input is provided, usually the result could be seen in less than 10 seconds on the hardware renderer which rendered about 20,000 strands. The accompanying video shows step by step how the above modeling procedure is done. When a desired hairstyle is formed after tuning the parameters, it finally went through a software renderer The software rendering took about 30 minutes to render a hairstyle. Real hairstyles and the corresponding synthetic imitations have been modeled after the real ones: (a) a real hairstyle and (b) a corresponding synthetic one generated by applying the statistical wisp model and hair deformation solver; (c) a real updo hairstyle; and (d) a synthetic imitation of it obtained by applying the constraint-based styler.

6.1 Producing Styling Force Field

Currently, we construct the styling force field using a procedural approach. For convenience, we provide the users predefined force fields—e.g., gravity field, pulled-back hair field. To allow general users to fully exploit our system, a tool for editing vector fields, such as the one described in [8], should be implemented in the future.

It needs to be noted that our use of vector field is somewhat different from that in the previous work [8, 31] where almost all the aspects of hairstyles are directly controlled by the vector field. For instance, the vector field should be carefully constructed to prevent the penetration of hair into head. The stand details are also controlled by the vector field: e.g., curly hair is generated by applying perturbations to the vector field.

On the other hand, the construction of the force field in our system is much less cumbersome since the field is used only for the rough-level control of a hairstyle. The detailed properties of hair depend on separate controls. Preventing the penetration of hair into the head is done by the collision resolution procedure (Section 3.2). Geometric details of hair strands are generated inside the wisp model (Section 2). Therefore, even though the current procedural construction is not an ultimate interface for specifying the force fields in general, it already provides enough flexibility to generate the variety of hairstyles.

Figure 13:
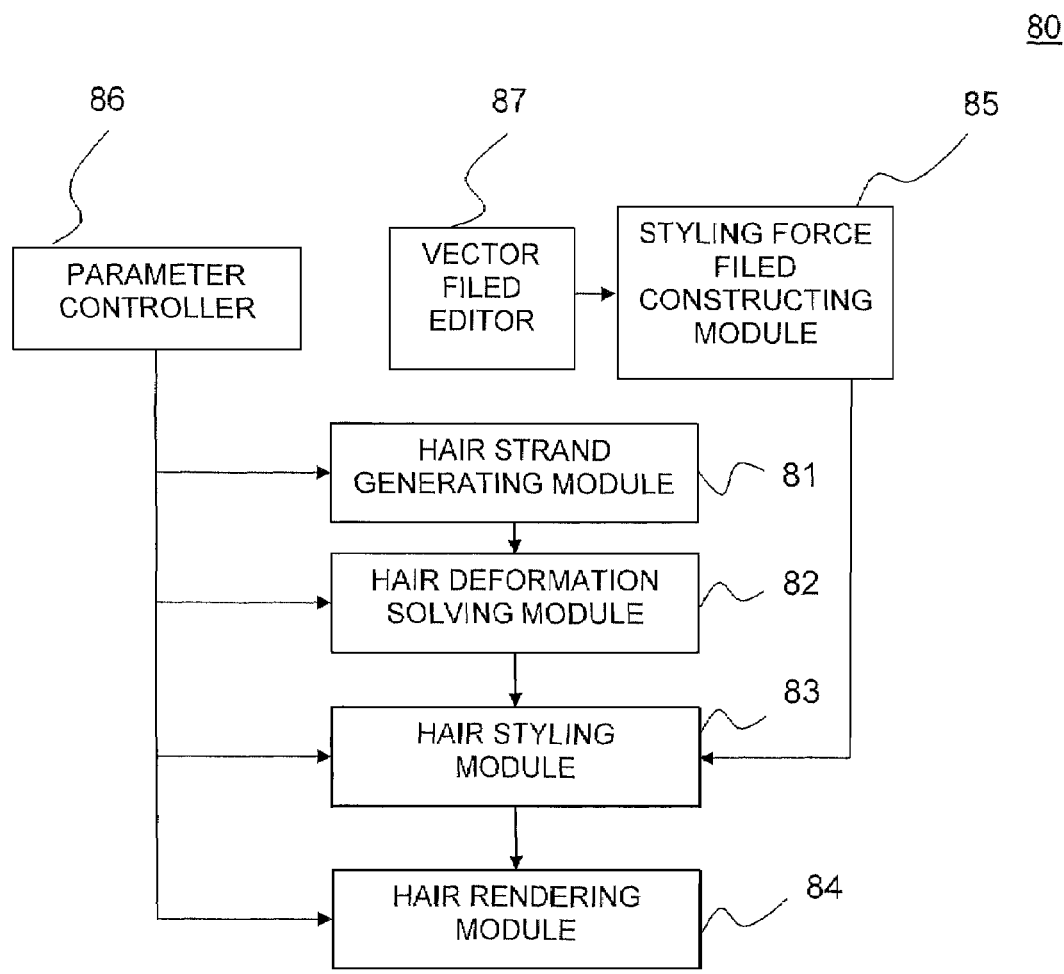
FIG. 13 shows a block diagram of a system according to the present invention.

As shown in FIG. 13, a system 80 for interactive hairstyle generation using statistical wisp model and pseudo-physical approaches includes a hair strand generating module 81, a hair deformation solving module 82, a hair styling module 83, a hair rendering module 84, a styling force field constructing module 85, and a parameter controller 86. The styling force field constructing module 85 includes a vector field editor 87.

The hair strand generating module 81 is for generating hair strands and wisps by controlling the statistical properties of hair using a statistical wisp model. The hair deformation solving module 82 is for solving the hair deformation due to gravity and collisions between the hair by a pseudo-physical approaches using a styling force field.

The hair styling module 83 is for styling the hair by superimposing a constraint force field with the styling force field and solving the hair deformation. The hair rendering module 84 is for rendering the hair strands using probability density functions to represent the randomness of hair color. And, the styling force field constructing module 85 is for constructing a styling force field using procedural approach with a means for editing a vector field using the vector field editor 87.

6.2 Hairdressing Operations

Since the five hairdressing operations—cutting, permanent waving, combing, tying and braiding—would produce most human hairstyles, showing that our modeling system is capable of implementing these operations can give an estimation of the applicable range of the proposed technique.

Cutting: it can be implemented by directly editing the length map.

Permanent waving: it can be achieved by giving a prototype strand 30 of the desired shape to the statistical wisp model.

Combing: it can be implemented using a direction constraint. First, a portion of hair is selected for combing, then the desired trajectory is indicated. Finally, we specify the weight w of Eq. (7) that controls the influence of the constraint force field relative to the styling force field.

Tying: The portion to tie is selected, and a point constraint 61 is imposed so that the selected portion is attracted to the point. A value of w=1 is used so that the portion is entirely affected by the constraint force field. Once the constraint is met, the selected portion is then affected by the normal styling force field.

Braiding: it can be implemented by applying a point constraint 61 followed by a trajectory constraint 62 to three or more groups of hair. Each group of strands is first gathered at the point specified by the point constraint 61. Then the trajectory constraint 62 is applied so that the strands form braids.

7. Conclusion

We have presented a technique for interactively modeling human hair. A variety of hairstyles can be generated by modifying a small number of wisp parameters while the effect of gravity is automatically solved by the hair deformation solver. The framework is quite versatile to be capable of realizing familiar but non-trivial styling operations such as permanent waving and braiding in a straightforward manner. The technique provides improvements over previous methods in the reality of the result and the range of hairstyles it can produce.

The speedup, realism and diversity are possible due to the combination of the statistical wisp model, the hair deformation solver, the constraint-based styler and the stochastic hair color model.

Firstly, the statistical wisp model has relieved us from modeling each hair strand manually or by employing parametric functions. We have introduced an example-based Markov chain model to synthesize a master strand 10 from a given prototype curve. We duplicate a master strand 10 to neighboring member strands 20 by creating statistically-controlled variations.

Secondly, we have proposed a solver to compute the deformations due to the gravity and collisions. By tailoring the solver to static hairstyles, we could make it work fast.

Thirdly, some hairstyles, such as braids or updo styles, require tedious hairdressing operations, and have been difficult to synthesize. The constraint-based styler provides us an effective way of producing such styles. Even though there are only three types of constraints, the combinations of them can produce a wide range of styles, as shown in FIG. 18.

Finally, by using probability density functions to represent the randomness of hair color, we have obtained more realistic results even with the traditional Kajiya and Kay shading model. We plan to explore using a more sophisticated shading model proposed by Marschner et al. [19], combined with the stochastic color model.

The paper by the inventors, Byoungwon Choe and Hyeong-seok Ko, A Statistical Wisp Model and Pseudophysical Approaches for Interactive Hairstyle Generation, IEEE Transactions on Visualization and Computer Graphics, vol. 11, no. 2, 160-170, March 2005, is incorporated by reference into this disclosure as if fully set forth herein. Also, all reference papers, list below, referred to by the paper by the inventors are incorporated by reference into this disclosure as if fully set forth herein.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

[1] K. Anjyo, Y. Usami, and T. Kurihara. A simple method for extracting the natural beauty of hair. In *Computer Graphics (Proceedings of SIGGRAPH* 92), volume 26, pages 111-120, July 1992.

[2] A. A. Apodaca and L. Gritz. *Advanced RenderMan: Creating CGI for Motion Pictures*. Morgan Kaufmann, 1999.

[3] F. Bertails, T. Kim, M.-P. Cani, and U. Neumann. Adaptive wisp tree—a multiresolution control structure for simulating dynamic clustering in hair motion. In *ACM SIGGRAPH Symposium on Computer Animation*, pages 207-213, 2003.

[4] J. T. Chang, J. Jin, and Y. Yu. A practical model for hair mutual interactions. In *ACM SIGGRAPH Symposium on Computer Animation*, pages 73-80, July 2002.

[5] A. Daldegan, N. M. Thalmann, T. Kurihara, and D. Thalmann. An integrated system for modeling, animating and rendering hair. 12(3):211-221, 1993.

[6] A. A. Efros and T. K. Leung. Texture synthesis by nonparametric sampling. In *IEEE International Conference on Computer Vision, pages* 1033-1038, September 1999.

[7] D. B. Goldman. Fake fur rendering. In *Proceedings of SIGGRAPH* 97, Computer Graphics Proceedings, Annual Conference Series, pages 127-134, August 1997.

[8] S. Hadap and N. Magnenat-Thalmann. Interactive hair styler based on fluid flow. In *Computer Animation and Simulation* 2000, pages 87-99, August 2000.

[9] S. Hadap and N. Magnenat-Thalmann. Modeling dynamic hair as a continuum. *Computer Graphics Forum (Eurographics* 2001), 20(3):329-338, 2001.

[10] A. Hertzmann, N. Oliver, B. Curless, and S. M. Seitz. Curve analogies. In *Rendering Techniques* 2002: *13th Eurographics Workshop on Rendering*, pages 233-246, June 2002.

[11] J. T. Kajiya and T. L. Kay. Rendering fur with three dimensional textures. In *Computer Graphics (Proceedings of SIGGRAPH* 89), volume 23, pages 271-280, July 1989.

[12] T. Kim and U. Neumann. A thin shell volume for modeling human hair. In Computer *Animation* 2000, pages 104-111, May 2000.

[13] T. Kim and U. Neumann. Opacity shadow maps. In *Rendering Techniques* 2001: *12th Eurographics Workshop on Rendering*, pages 177-182, June 2001.

[14] T. Kim and U. Neumann. Interactive multiresolution hair modeling and editing. *ACM Transactions on Graphics (Siggraph* 2002), 21(3):620-629, July 2002.

[15] A. LeBlanc, R. Turner, and D. Thalmann. Rendering hair using pixel blending and shadow buffer. *Journal of Visualization and Computer Animation*, 2:92-97, 1991.

[16] D. Lee and H. Ko. Natural hairstyle modeling and animation. *Graphical Models*, 63(2):67-85, March 2001.

[17] E. Lindholm, M. J. Kilgard, and H. Moreton. A user-programmable vertex engine. In *Proceedings of ACM SIGGRAPH* 2001, Computer Graphics Proceedings, Annual Conference Series, pages 149-158, August 2001.

[18] T. Lokovic and E. Veach. Deep shadow maps. In *Proceedings of ACM SIGGRAPH* 2000, Computer Graphics Proceedings, Annual Conference Series, pages 385-392, July 2000.

[19] S. R. Marschner, H. W. Jensen, M. Cammarano, S. Worley, and P. Hanrahan. Light scattering from human hair fibers. *ACM Transactions on Graphics (Siggraph* 2003), 22(3):780-791, July 2003.

[20] R. R. Ogle and M. J. Fox. *Atlas of Human Hair: Microscopic Characteristics*. CRC Press, 1999.

[21] S. Paris, H. M. Briceno, and F. X. Sillion. Capture of hair geometry from multiple images. *ACM Transactions on Graphics (Siggraph* 2004), 23(3):712-719, August 2004.

[22] E. Plante, M. Cani, and P. Poulin. Capturing the complexity of hair motion. *Graphical Models,* 64(1):40-58, January 2002.

[23] C. R. Robbins. *Chemical and Physical Behavior of Human Hair*. Springer-Verlag, 4th edition, December 2000.

[24] R. E. Rosenblum, W. E. Carlson, and E. Tripp. Simulating the structure and dynamics of human hair: modeling, rendering and animation. *The Journal of Visualization and Computer Animation*, 2:141-148, 1991.

[25] K. Ward and M. C. Lin. Adaptive grouping and subdivision for simulating hair dynamics. In *Pacific Conference on Computer Graphics and Applications*, 2003.

[26] K. Ward, M. C. Lin, J. Lee, S. Fisher, and D. Macri. Modeling hair using level-of-detail representations. In *Proc. of Computer Animation and Social Agents*, 2003.

[27] Y. Watanabe and Y. Suenaga. A trigonal prism-based method for hair image generation. *IEEE Computer Graphics & Applications,* 12(1):47-53, January 1992.

[28] L. Wei and M. Levoy. Fast texture synthesis using tree-structured vector quantization. In *Proceedings of ACM SIGGRAPH* 2000, Annual Conference Series, pages 479-488, July 2000.

[29] Z. Xu and X. D. Yang. V-hairstudio: an interactive tool for hair design. *IEEE Computer Graphics & Applications*, 21(3):36-42, 2001.

[30] X. D. Yang, Z. Xu, J. Yang, and T. Wang. The cluster hair model. *Graphical Models*, 62(2):85-103, March 2000.

[31] Y. Yu. Modeling realistic virtual hairstyles. In *9th Pacific Conference on Computer Graphics and Applications*, pages 295-304, October 2001.

What is claimed is:

1. A method for graphical hairstyle generation comprising steps of:
   a) generating hair strands and wisps by controlling the statistical properties of hair using a statistical wisp model;
   b) solving the hair deformation due to gravity and collisions between the hair by a pseudo-physical approaches using a styling force field;
   c) styling the hair by superimposing a constraint force field with the styling force field and solving the hair deformation; and
   d) drawing the hair strands using probability density functions to represent the randomness of hair color,
   wherein the step of generating hair strands and wisps comprises steps of:
   modeling first hair strands using an example-based Markov chain model from a given prototype strand; and
   duplicating the first hair strands to the neighboring second hair strands by creating statistically-controlled variations,
   wherein the hair strand is represented as a Catmull-Rom spline, wherein the Catmull-Rom spline is defined and passes through a sequence of control points $\{p_1, p_2, \ldots p_n\}$, wherein the spline $p(s)$ is parameterized within the range $[0,1]$, wherein $p(0)=p_1$ and $p(1)=p_n$ correspond to the root and the tip of the strand respectively, wherein the overall shape of the wisp is a generalized cylinder and the hair strands within the wisp have a similarity, wherein the degree of similarity of the strands within a wisp is controlled by a length distribution, a deviation radius function, and a strand-shape fuzziness value, wherein the length distribution $l(u)$ is probability density function that gives the probability that a member strand will have length u, relative to the length of the master strand, wherein the deviation radius function $r(s)$ specifies an upper limit on the positional offset of the member strands from the master strand at the parameter value s and controls the shape of the generalized cylinder representing the wisp, wherein the strand-shape fuzziness value $\sigma$ controls the variation of the strands within a wisp.

2. The method of claim 1, wherein the second hair strands are formed from the first hair strands by applying $l(u)$, $r(s)$, and $\sigma$.

3. The method of claim 2, wherein the k-th control point $p_k$ of the second hair strand is computed by adding a displacement $d_k$ to the k-th control point $p_k^m$ of the first hair strand as $p_k = p_k^M + d_k$, wherein with a predetermined displacement at the root $d_1 = p_1 - p_1^M$, $d_k$ is computed iteratively using $$d_k = \frac{r_k}{r_{k-1}} d_{k-1} + e,$$

where $r_{k-1}$ and $r_k$ are the derivation radii at $p_{k-1}$ and $p_k$ respectively, and e is a three-dimensional noise vector, wherein the noise vector $e = y\bar{x}$ lies within the sphere of radius $r_k$ according to the definition of the deviation radius function, wherein the noise vector is determined by selecting the unit direction vector $\bar{x}$ randomly and choosing y randomly while $|d_k| < r_k$ is satisfied, wherein y is chosen by casting a ray originating from $$p_k^O = p_k^M + \frac{r_k}{r_{k-1}} d_{k-1}$$

in the direction of $\bar{x}$ until the ray intersects the sphere at a point $p_k^S$ and choosing a value from the uniform distribution of the range $[0, \min(L, \sigma \cdot r_k)]$, where L is the distance from $p_k^O$ to $p_k^S$.

4. The method of claim 1, wherein the entire hair possesses a common pattern, wherein the first hair strands are enforced to have the same pattern and then the same pattern is extended to the second hair strands, wherein a similar strand with a common pattern is synthesized from the prototype strand using the example-based Markov chain model with a Gibbs distribution to mathematically control the degree of similarity between the prototype and the synthesized strand.

5. The method of claim 4, wherein the step of modeling the first hair strands comprises steps of:
   a) decomposing the control points $\{p_1, p_2, \ldots p_n\}$ of the first hair strand into an outline component $\{c_1, c_2, \ldots c_n\}$ and a details component $\{\delta_1, \delta_2, \ldots \delta_n\}$, $p_i = c_i + \delta_i$, where $i=1, 2, \ldots, n$ corresponding to the positions of the 3-DOF rotary joints, wherein the outline component corresponds to a straight line segment and the details component represents the position of the joint; and
   b) constructing the details component of a new strand by sequentially determining $\delta_i$ ($i=1, 2, \ldots, n$) until the strand reaches the desired length while observing only the neighborhood of $\delta_i$, wherein $\delta_i$ is determined by examining the prototype strand and finding the best match $\delta_k^*$ while restricting the comparison only to the neighborhood of $\delta_i$, wherein $\{\delta_1^*, \delta_2^*, \ldots, \delta_n^*\}$ is the details component of the prototype strand.

6. The method of claim 5, wherein the step of constructing the details component of the new strand comprises a step of finding a portion $\omega(\delta_k^*) = \{\delta_{k-h}^*, \delta_{k-h+1}^*, \ldots \delta_{k-1}^*\}$ of the prototype strand to determine $\delta_i$, wherein $\omega_k^*$ minimizes $\epsilon(\omega_i, \omega_k^*)$, wherein $$\varepsilon(\omega_i, \omega_j) = \sqrt{\sum_{t=1}^{h} |\delta_{i-t} - \delta_{j-t}|^2}$$

is an Euclidean distance between the two h-sized portion $\omega(\delta_i)$ and $\omega(\delta_j)$.

7. The method of claim 5, wherein the step of constructing the details component of the new strand comprises a step of selecting the details component stochastically using the Gibbs distribution as a selection probability $P_k$ for each possible portion of the prototype strand $$P_k = \frac{1}{Z} \exp\left(-\frac{\varepsilon(\omega_i, \omega_k^*)}{T}\right),$$

where T is the temperature of the system, which can be controlled by the user, and Z is the partition function defined by $$Z = \sum_k \exp(-\varepsilon(\omega_i, \omega_k^*)/T).$$

8. The method of claim 1, wherein the root positions of the first hair strands are the root positions of the first hair strands are determined by distributing the number of points over the scalp region and the roots of the second hair strands are randomly located within each Voronoi region, wherein Voronoi diagrams are generated to set the boundary of each wisp, wherein the step of generating hair comprises a step of constructing a density, length and protrusion maps defining the corresponding hair properties for every point in the scalp region, wherein the length and protrusion direction of the first hair strands is determined by the length and protrusion maps.

9. The method of claim 1, wherein the step of solving the hair deformation repeats steps of:
deforming the strands based on the styling force field; and
updating the density field based on the deformation,
wherein the steps run in breadth-first order, wherein the step of deforming the strands comprises steps of:
  a) treating gravity and the current styling operation as a unified force field $\Phi(x)$ using pseudo-physical approaches;
  b) modeling hair as a continuum, interpreting density as a measure of collision, and forcing the collided hairs to occupy a larger volume, wherein it is regarded that a collision occurs when the density of a certain region is above a given threshold;
  c) rotating each of the joints along an entire first hair strand by the styling force field $\Phi(x)$ so that the outline segment attached to the joint is oriented along $\Phi(x)$, where x is a point in 3D space; and
  d) detecting hair collisions at the wisp level and reorienting the collided wisp segment based on the gradient of the density field.

10. The method of claim 9, wherein the step of rotating the joint by the styling force field comprises a step of determining the orientation of a segment by finding the joint angle that maximizes the equation:

$$E = E_\Phi + \kappa E_B,$$

wherein $E_\Phi$, the degree to which the strand is aligned with the force field, and $E_B$, the degree to which the strand is aligned with its rest position, are calculated as $E_\Phi = \Phi(x) \cdot q$, and $E_B = q_0 \cdot q$, where q is the unit direction vector of the segment and $q_0$ is the direction of the segment when the joint angle is zero.

11. The method of claim 9, wherein the step of detecting hair collisions and reorienting the collided wisp segment comprises steps of:
  a) creating a density field for each wisp segment by computing density value $$\rho = N \frac{r_s^2}{r_w^2},$$

where N is the number of strands in the wisp, $r_s$ is the average radius of the strands in the wisp, $r_w$ is the radius of the wisp; and
  b) determining a collision by checking the condition $\rho(x) + \rho_A(x) > \tau$, where $\rho(x)$ is an existing density value at x, $\rho_A(x)$ is an increased density due to the positioning of the wisp segment, and $\tau$ is a density threshold.

12. The method of claim 9, wherein the steps run in depth-first order.

13. The method of claim 1, wherein the step of styling the hair comprises steps of:
  a) selecting the portion of hair, consisting of a set of wisps, to apply the constraints;
  b) building a constraint queue, a sequence of constraints, to apply to the selected portion;
  c) superimposing the constraint force field with the styling force field for the selected portion; and
  d) solving the deformation with the modified styling force field.

14. The method of claim 13, wherein the constraint force field $\Psi(x)$ is superimposed with the styling force field $\Phi(x)$ to give a modified styling force field,
$\Phi'(x) = (1-w)\Phi(x) + w\Psi(x)$, where w is a weight of the constraint force field.

15. The method of claim 13, wherein the constraint force field comprises
  a) point constraint specified by an attraction point and a tolerance radius, producing vector fields toward the attraction point;
  b) trajectory constraints specified by a trajectory and a tolerance radius, generating unit vectors toward the nearest point of the trajectory for grid points lying outside the tolerance radius, or in the tangential direction of the trajectory for grid points lying inside the tolerance radius; and
  c) direction constraint specified by a trajectory and an influence radius, generating unit vectors in the tangential direction of the trajectory for grid points lying within the influence radius.

16. The method of claim 1, wherein the step of rendering the hair strands comprises a step of modulating the change of hair colors stochastically using independent probability density functions for a plurality of coloring properties with either uniform or Gaussian distribution.

17. The method of claim 16, wherein the coloring properties are represented by a HSV color space, model hue, and saturation and value channels.

18. The method of claim 16, wherein the step of rendering the hair further comprises steps of:
  a) converting the Catmull-Rom splines to thin ribbons to render individual hair strands;
  b) shading each strand using hair shading model; and
  c) representing the self-shadowing among hair strands using deep shadow map.

19. The method of claim 1, further comprising steps of:
constructing the styling force field by controlling the force field for the rough-level control of a hairstyle and generating the geometric details inside the wisp model.

20. The method of claim 19, wherein the basic hairdressing operations comprise cutting, permanent waving, combing, tying, and braiding.

21. The method of claim 20, wherein the cutting is implemented by directly editing a length map.

22. The method of claim 20, wherein the permanent waving is implemented by giving a prototype strand of the desired shape to the statistical wisp model.

23. The method of claim 20, wherein the combing is implemented using a direction constraint by selecting a portion of hair for combing and indicating the desired trajectory, and specifying the weight that controls the influence of the constraint force field relative to the styling force field.

24. The method of claim 20, wherein the tying is implemented by selecting the portion to tie, imposing a point constraint so that the selected portion is attracted to the point, setting the weight value to a maximum so that the portion is entirely affected by the constraint force field.

25. The method of claim 20, wherein the braiding is implemented by applying a point constraint followed by a trajectory constraint to three or more groups of hair, wherein each group of strands is first gathered at the point specified by the point constraint, and then the trajectory constraint is applied so that the strands form braids.

* * * * *